United States Patent
Holcomb et al.

(10) Patent No.: US 6,672,524 B1
(45) Date of Patent: Jan. 6, 2004

(54) MULTIPLE CHAMBER CONDIMENT GRINDER

(75) Inventors: David A. Holcomb, Seattle, WA (US); Peter A. Ryding, Seattle, WA (US)

(73) Assignee: Chef'N Corporation, Seattle, WA (US)

( * ) Notice: Subject to any disclaimer, the term of this patent is extended or adjusted under 35 U.S.C. 154(b) by 476 days.

(21) Appl. No.: 09/656,498

(22) Filed: Sep. 7, 2000

(51) Int. Cl.$^7$ ................................................ A47J 42/32
(52) U.S. Cl. ........................................ 241/169; 241/168
(58) Field of Search ................................ 241/168, 169, 241/602, DIG. 27

(56) References Cited

U.S. PATENT DOCUMENTS

| | | |
|---|---|---|
| 95,135 A | 9/1869 | Petrie |
| 265,819 A | 10/1882 | Johnson |
| 1,264,134 A | 4/1918 | Quick |
| 1,588,552 A | 6/1926 | Sprinkle |
| 1,692,162 A | 11/1928 | Exsternbrink |
| 3,827,641 A | 8/1974 | Andersson ............. 241/101 R |
| 4,573,244 A | 3/1986 | Holcomb et al. ........... 241/169 |
| 4,632,322 A * | 12/1986 | Beilstein ................. 241/169.1 |
| 4,685,627 A | 8/1987 | Lee .......................... 241/169.1 |
| 4,697,749 A | 10/1987 | Holcomb et al. ........... 241/169 |
| 4,709,865 A | 12/1987 | Bounds .................... 241/169.1 |
| 4,844,352 A * | 7/1989 | Griffin ..................... 241/101.2 |
| 5,148,995 A * | 9/1992 | Hurst .......................... 241/30 |
| 5,269,475 A | 12/1993 | Diefenbach .............. 241/169.1 |
| 5,531,389 A * | 7/1996 | Husted ..................... 241/169.1 |
| 5,651,506 A | 7/1997 | Hockey ................... 241/169.1 |
| 5,730,374 A | 3/1998 | Wu .............................. 241/169 |
| 5,988,543 A | 11/1999 | Wu .............................. 241/168 |

FOREIGN PATENT DOCUMENTS

| | | |
|---|---|---|
| GB | 2 355 946 A | 5/2001 |
| WO | WO 00/28870 | 5/2000 |

* cited by examiner

*Primary Examiner*—William Hong
(74) *Attorney, Agent, or Firm*—Seed IP Law Group PLLC

(57) ABSTRACT

A dual chamber condiment grinder has more than one chamber for holding a different condiment in each, and each chamber has a rasp that can be selectively moved up and down to grind the condiment in the associated chamber. An actuating handle rotates on the top of the chambers to position a cam over one or the other of the rasps to selectively grind the contents of one of the chambers. In the alternative, the cam can move in a slot in a movable handle to position the cam over the desired rasp.

20 Claims, 5 Drawing Sheets

MULTIPLE CHAMBER CONDIMENT GRINDER

TECHNICAL FIELD

This invention relates to hand-held condiment grinders that include multiple chambers and a grinding actuating mechanism that will selectively actuate a grinder mechanism for each chamber.

BACKGROUND OF THE INVENTION

Hand-held condiment grinders are known. These grinders usually have a single chamber for holding only one condiment at a time, such as, peppercorns, salt, seeds or the like. One grinder of this type is shown in U.S. Pat. Nos. 4,697,749 and 4,573,244. Some grinders have more than one chamber to hold more than one condiment at the same time but these multiple chamber grinders require more complicated, separately actuated grinding mechanisms, each fully separate from the other so that two different grinding mechanisms and actuating mechanisms for those grinding mechanisms are required.

SUMMARY OF THE INVENTION

This invention is a multiple chamber condiment grinder, preferably having two separate chambers, but in which a common grinding actuating mechanism is used by being selectively positioned over each chamber. In one embodiment, the grinding actuating mechanism is rotatably mounted to be rotated selectively over one or the other of the separate chambers. In another embodiment, a cam is moved to be selectively positioned over one or the other of the separate chambers. Other variations of the selective actuation of the grinding mechanism may also be employed.

DETAILED DESCRIPTION OF THE PREFERRED EMBODIMENTS

Figure 1:
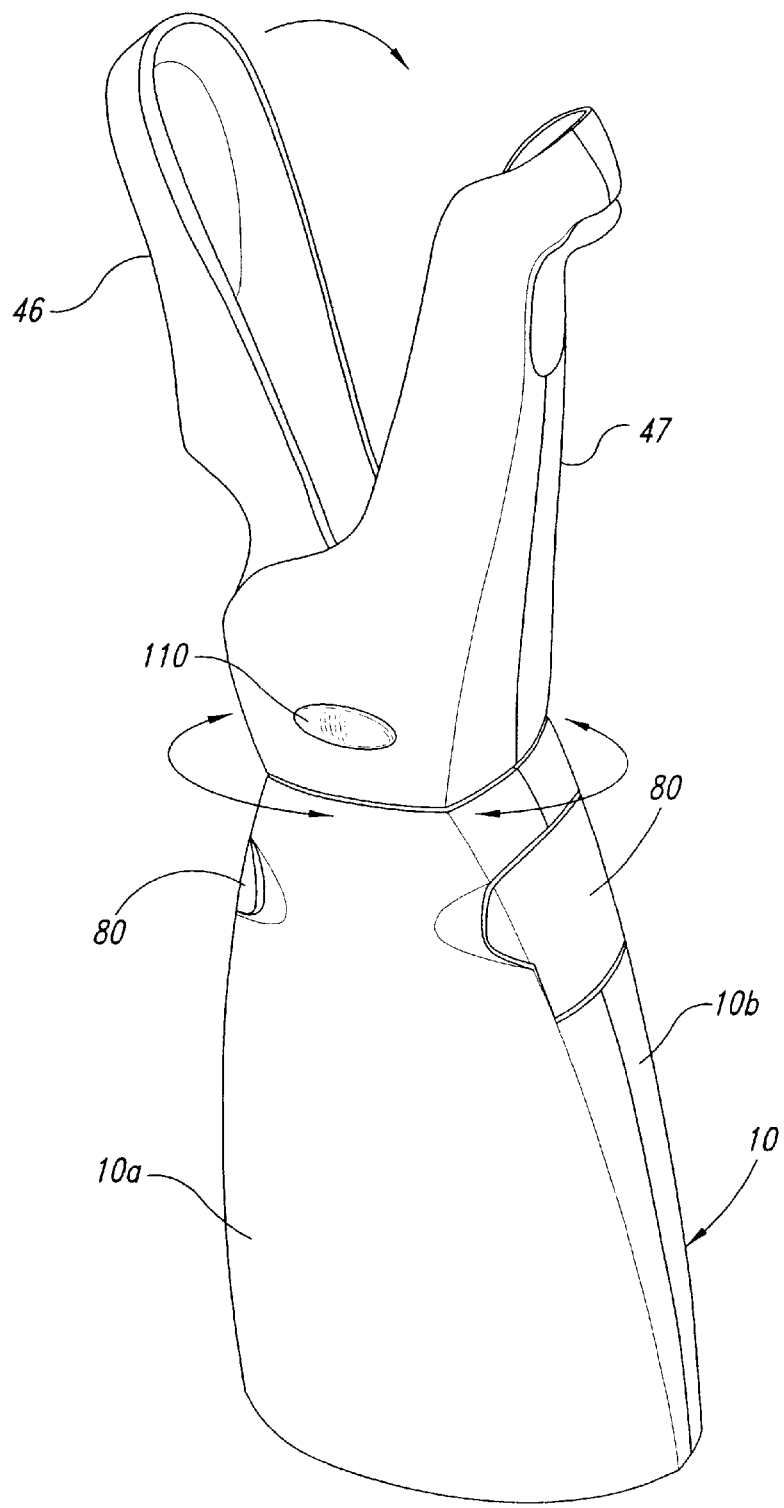
FIG. 1 is a perspective view of the grinder.
Figure 2:
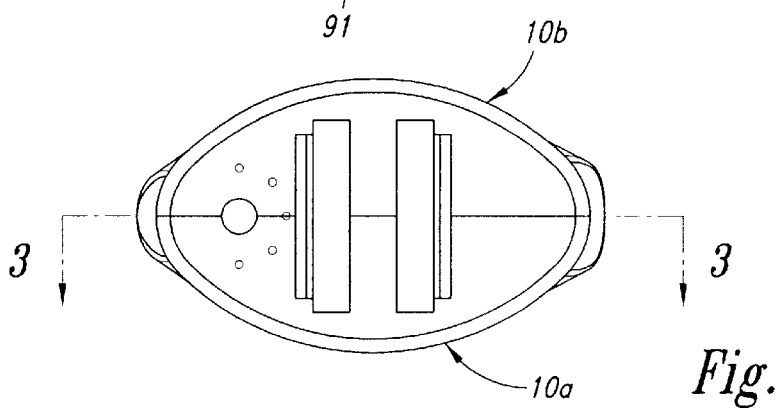
FIG. 2 is a bottom view with parts broken away for clarity.
Figure 6:
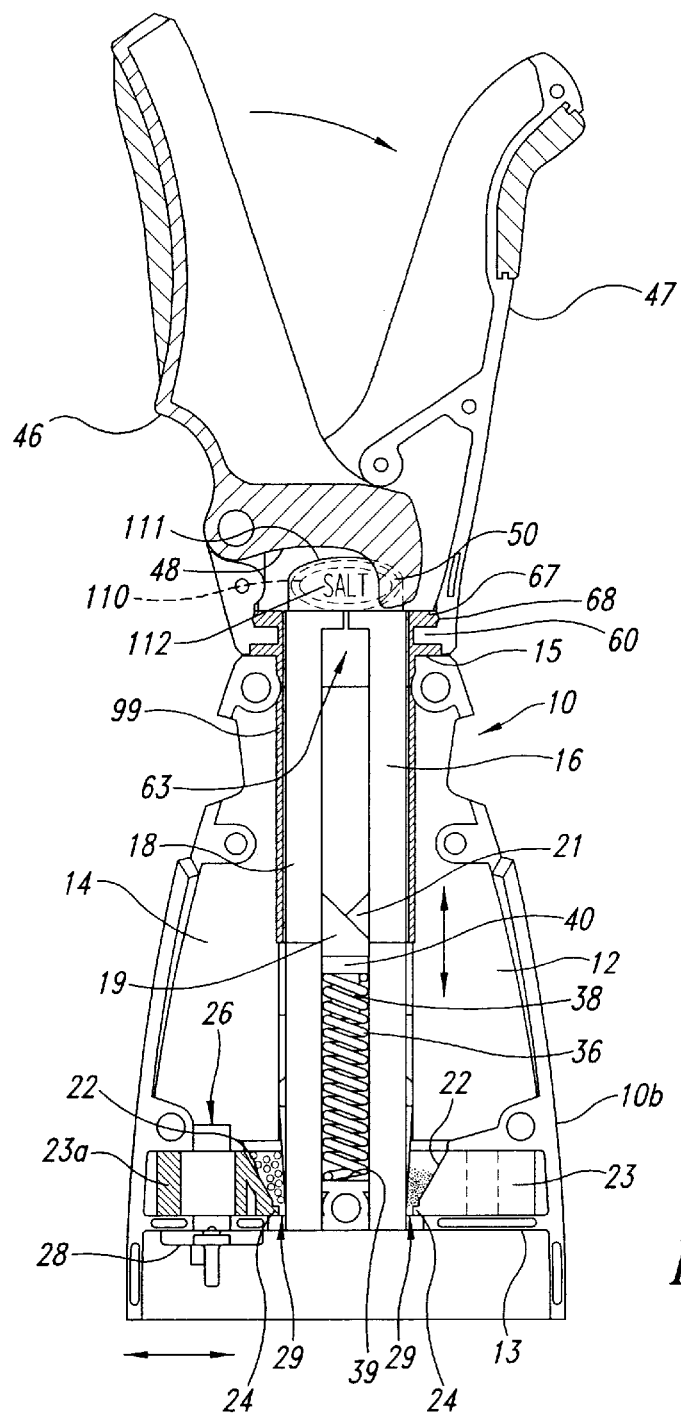
FIG. 6 is a longitudinal section taken along the line 6—6 of FIG. 5.
Figures 7C, 8C:
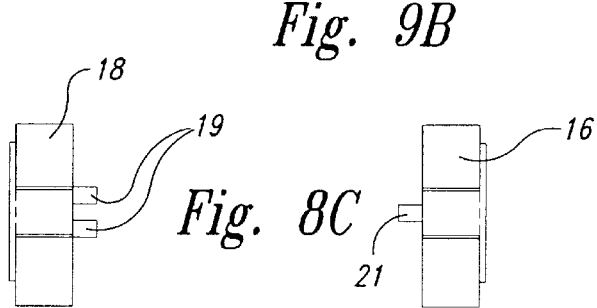
FIG. 7C is a top view of the rasp.
FIG. 8C is a top view of the rasp.
Figure 7A:
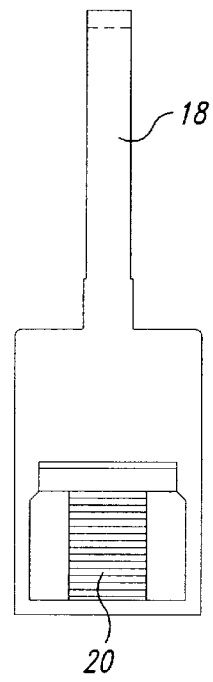
FIG. 7A is a front view of the rasp 18 forming part of the grinder.
Figure 8B:
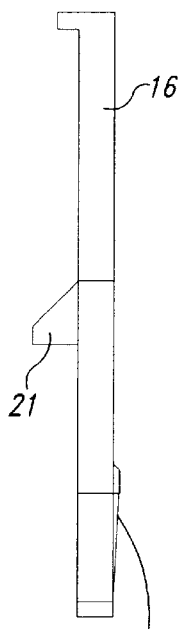
FIG. 8B is a side elevation thereof.
Figure 8A:
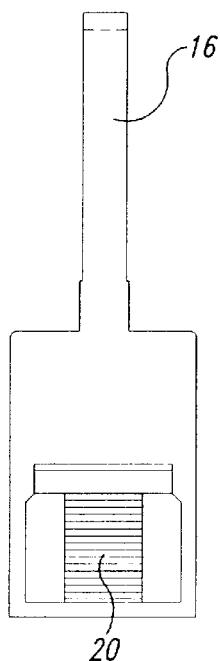
FIG. 8A is a front view of the rasp 16 forming part of the invention.

As best shown in FIGS. 1, 2 and 6, the grinder includes a housing 10 formed from two joined halves 10a and 10b and having at least two chambers 12, 14. For the purpose of this invention it will be understood that two chambers will be used, however, more than two chambers are also possible. A first chamber 12 (FIG. 6) may hold one condiment, such as, salt. A second chamber 14 may hold a second condiment, such as, peppercorns. Each chamber has a lower wall 13 and an upper wall 15. A first rasp 16 is positioned in the first chamber 12 and a second rasp 18 is positioned in the second chamber 14. Each rasp 16, 18 has teeth or spaced grinding edges 20 (FIGS. 7A and 8A) that are spaced from a shear block 23 and 23a mounted in the bottom wall of chambers 12 and 14, respectively.

Figure 5:
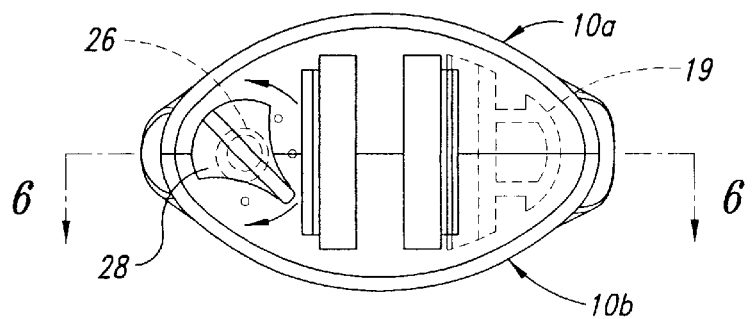
FIG. 5 is a bottom view of the grinder.

Each of the shear blocks 23, 23a has a ramp 22 and a shearing edge 24, although other forms of a shearing surface are also contemplated. The shearing blocks can both be adjustably spaced from the teeth 20 of the rasp to control the size of the ground particles. The space between each of the rasps 16, 18 and the associated shearing edge 24 defines a discharge gap 29 for discharging ground condiment. In the alternative, the shearing blocks 23, 23a for each chamber 12, 14 can be fixed to not adjust the size of the ground condiment. In the embodiment shown in the drawing, particularly FIGS. 5 and 6, one of the shear blocks 23a is made adjustable by an eccentric pin 26 that can be rotated by a knob 28. Rotation of the knob 28 will cause the shear block 23a to move toward or away from the rasp 18 to change the width of gap 29 between the block 23a and the rasp 18 and thus control the size of the ground condiment. This is particularly desirable for peppercorns as users often have different preferences for the size of the ground pepper.

Figures 7B, 7D:
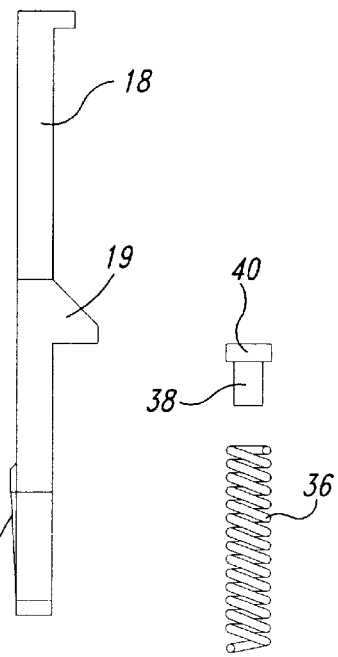
FIG. 7B is a side elevation thereof.
FIG. 7D is an exploded view of a return spring for actuation of the rasp.

The rasps 16 and 18 extend up through the top wall 15 of the chambers 12, 14 and are spaced from one another, as shown in FIG. 6. One rasp 18 has a fork with arms 19 (FIGS. 7B and 7C) forming a space therebetween and extending out toward the other rasp 16. The other rasp 16 has a tongue 21 (FIGS. 8A and 8C) extending out therefrom and positioned in the space between the arms 19 of the fork. Both the arms 19 and the tongue 21 lie over a spring chamber. As best seen in FIGS. 6 and 7D, a spring 36 is positioned on a pin 38 having a flat enlarged cap 40. The bottom of the spring rests on a boss 39. As can be readily seen, if rasp 18 with the fork is moved downwardly, the spring 36 can be depressed without effecting the rasp 16 with the tongue 21 and vice versa. Thus, the rasps 16, 18 can be selectively actuated to grind the condiment in one chamber 12, 14 or the other.

The tops of the rasps 16, 18 extend up through the top wall 15 of the chambers 12, 14 and are engageable by a cam 50. The cam 50 may be formed on the end of an arm 48 formed on a movable handle 46. In this embodiment a second handle 47 is provided. The handles have a circular flange 60 (FIG. 3) that rides in a circular groove 62 formed in a collar 63 attached to the top walls of the chambers. In a preferred embodiment, the collar 63 is made of Delrin®, a hard and low friction form of plastic, or other plastic or metal. In the illustrated embodiment, the handles are rotated 180 degrees to selectively position the cam 48 over either the rasp 16 or the rasp 18. Thus, if the cam 50 is positioned over the rasp 16, for example, movement of the movable handle 46 toward the opposite handle 47 will move the cam 50 downwardly, thus pushing the rasp 16 only downwardly to grind the condiment in that chamber 12. The rasp 18 of the other chamber 14 will not be moved. By rotating the handles 46, 47 in the circular groove 62 to the opposite position, the cam 50 will actuate only the rasp 18.

Figure 4:
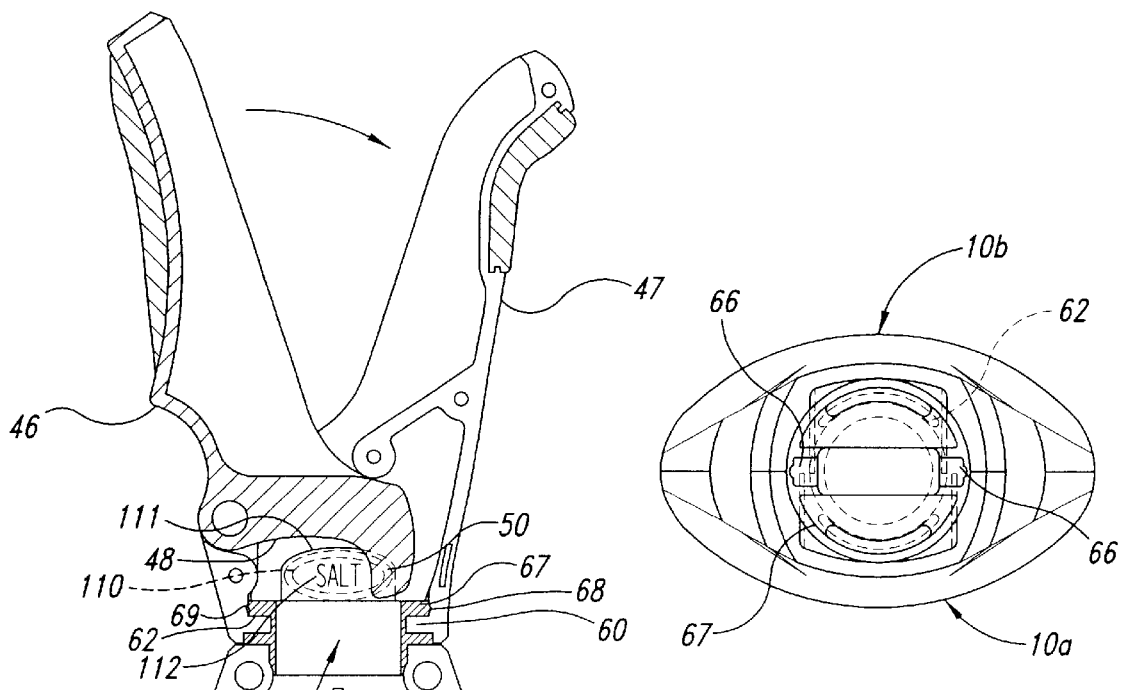
FIG. 4 is a top view of the housing with the handles and internal parts removed for clarity.

In a preferred embodiment, detents 66 (FIG. 4), spaced 180 degrees from each other, are formed on the top flange 67 of the collar 63. Mating indents 68 are formed 180 degrees apart in a groove 69 in the handles. As the handles are turned about the longitudinal axis of the housing, their indents move from one detent position, engaging detents 66, to the other detent position, again engaging detents 66, after 180 degrees of rotation. The indents 68 and mating detents 66 releasably hold the handles in one of their two operating positions while the grinder is being used.

Figure 3:
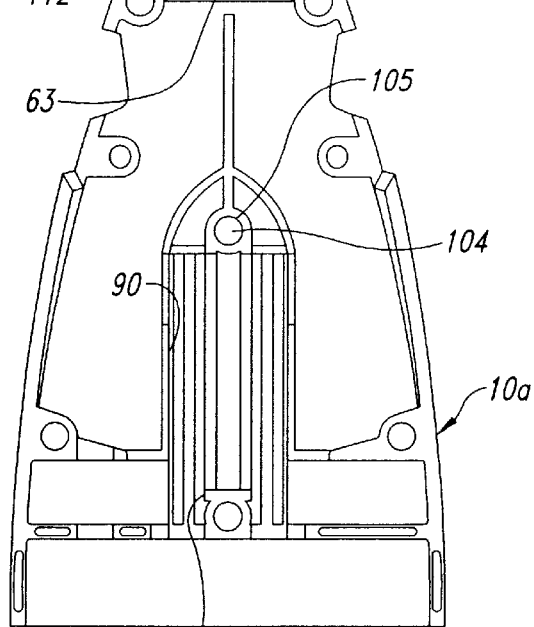
FIG. 3 is a longitudinal section taken along the line 3—3 of FIG. 2.

As best seen in FIGS. 1, 3 and 6, a transparent window 110 is provided in a bottom region of handle 47. As best seen in FIGS. 3 and 6, collar 63 is provided with a protrusion 111 extending upward from an upper region of collar 63. In a preferred embodiment, the name 112 of a first condiment is provided on one side of the protrusion, and the name of a second condiment (not shown) is provided on the opposite side of the protrusion, such that the two names are circumferentially spaced on the protrusion by 180 degrees. The protrusion 111 is aligned with the window 110 of the handle, such that the name of the condiment is visible through the window 110, and corresponds to the condiment that will be ground given the position of the handle. When the handles are rotated 180 degrees to the alternative operating position, the window 112 is then aligned with the name of the second condiment, corresponding to the condiment in the second chamber. In this manner, a user may simply look at the window 110 to determine the position of the handle and hence which condiment will be ground when the handle 46 is actuated. It will be understood that the names of any two condiments may be provided on the protrusion 111 of collar 63, although in a preferred embodiment, the collar 63 is marked with the words "salt" and "pepper." If desired, a second window (not shown) may be provided on the handle 47 opposite window 110 to continuously display a desired element, for example, a company logo.

Figure 9C:
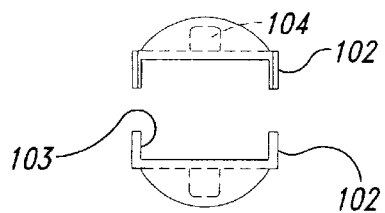
FIG. 9C is an exploded top view thereof.
Figure 9A:
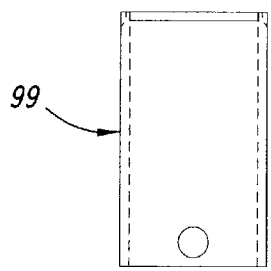
FIG. 9A is a front view of a rasp retaining sleeve forming part of the invention.
Figure 9B:
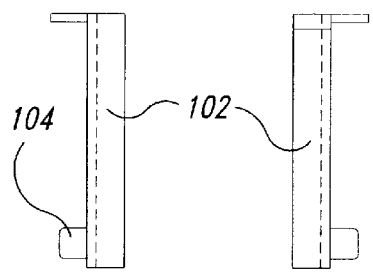
FIG. 9B is an exploded side elevation thereof.

Each rasp is guided in the housing by flanges 90 and 91 (FIG. 3). The tops of the rasps are guided by a rectangular sleeve 99 (FIG. 6), and shown in exploded view in FIGS. 9A–9C. The sleeve is formed of two parts 102 having guide walls 103 for slidably retaining the rasps when the sleeve is attached within the housing. Alternatively, the sleeve 99 may be formed as an integral piece. Receptacles 105 in the housings for pins 104 position the sleeve in fixed position in the housing 10.

Figure 11:
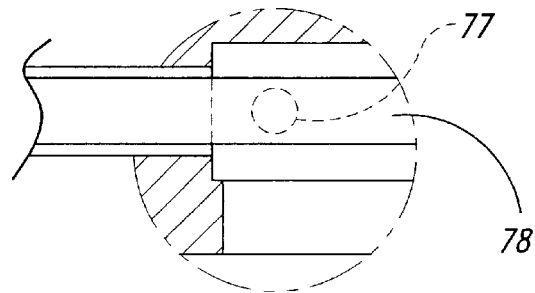
FIG. 11 is a fragmentary detail of the embodiment of FIG. 10.
Figure 10:
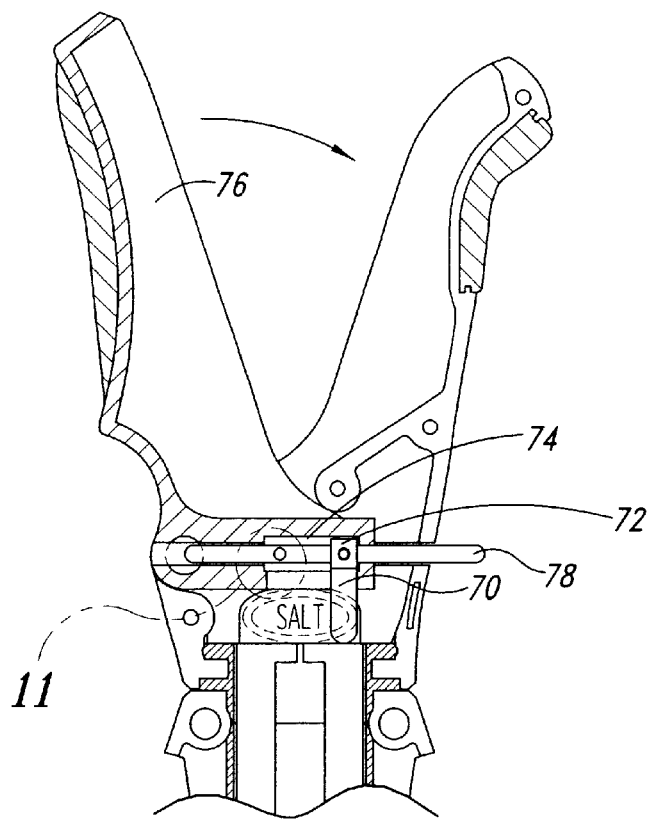
FIG. 10 is a fragmentary view of another embodiment of the invention.

In another embodiment, as shown in FIGS. 10 and 11, a cam 70 is attached to a square pin 72 that rides in a slot 74 of a movable handle 76. An adjustment rod 78 passes into the handle and is attached to the pin 72. The pin 72 is conventional of two pieces with a spring pushing them apart in a conventional manner as a detent. The ends of the pin 72 are rounded to fit into two detents or dimple positions 77 at opposite ends of the slot 74 to selectively provide for positioning the cam over one or the other of the rasps 16 or 18. Thus, the rod 78 can be moved in one direction to position the cam 70 over the rasp in one of the chambers. In the alternative, the rod can be moved in the opposite direction to position the cam over the other rasp in the other chamber. In the same manner as described above, when one of the rasps is moved downwardly by the movement of the moveable handle, the other rasp is unaffected.

As shown in the U.S. Pat. No. 4,697,749, the details of the disclosure of which are incorporated herein by reference thereto, each chamber will be provided with an access door 80 for filling the condiment in that chamber. Also the two halves are aligned by pins on one half with mating holes in the other half and then fused together by sonic welding or any other well known method.

More than one embodiment of the invention is shown and described it being understood that other equivalent embodiments not shown will be apparent to one skilled in the art. Thus, the invention is not to be limited to the embodiments shown in the drawings.

What is claimed is:

1. A multiple chamber condiment grinder, comprising:
   a first chamber for holding a first condiment to be ground;
   a second chamber adjacent the first chamber but separate therefrom for holding a second condiment to be ground, a shear block being provided in each of the first and second chambers;
   a first rasp positioned in the first chamber and a second rasp positioned in the second chamber, each of the first and second rasps having a top region, and shearing edges operatively spaced from said shear block in each chamber defining a discharge gap and for grinding a condiment between the rasp and the shear block and discharging the ground condiment through the discharge gap between the shear block and the rasp;
   a first handle;
   a movable second handle joined to said first handle and having an arm with a cam, said cam engageable with the top region of one of the first and second rasps for pushing the rasp downwardly in the chamber and the shearing edges of the rasp past the shearing block to grind the condiment;
   a return spring engageable with each rasp for raising the shearing edges up past the shearing block;
   said cam of said handle being mounted on said chambers to be selectively moved from a first position wherein the cam is located over the first rasp in the first chamber to a second position wherein the cam is located over the second rasp in a second chamber, whereby the rasp of each chamber can be selectively actuated for grinding the condiment in that chamber.

2. The grinder of claim 1, wherein the first and second handles are rotatably mounted on the chambers for selectively positioning the cam over the first or second rasp.

3. The grinder of claim 1, wherein the cam of said movable second handle is movable relative to said second handle from said first position over the first rasp to said second position over the second rasp.

4. The grinder of claim 1, said first rasp having spaced forks projecting therefrom overlying the spring, the spaced forks forming an opening therebetween, said second rasp having a tongue projecting therefrom and extending into the opening between said forks also overlying the spring.

5. The grinder of claim 4, further comprising a vertical pin between the rasps and beneath the fork and the tongue of the rasps, the pin having an enlarged top selectively engageable with the fork or the tongue, said spring encircling the pin and being compressed by downward movement of the pin.

6. The grinder of claim 2, said chambers each having a top wall, said top walls being joined and forming a circular opening, a collar fixed in said opening, the collar having a circular horizontal groove, said handles being joined to have a circular flange, the flange of the handles fitted within the groove of the circular collar for rotatably guiding the handles to the first and second positions.

7. The grinder of claim 1, at least one of said shear blocks being adjustable to vary the size of the discharge gap between the shear block and the shearing edges of the rasp for changing the coarseness of the ground condiment.

8. The grinder of claim 6, wherein said first rasp has spaced forks projecting therefrom overlying the spring, the spaced forks forming an opening therebetween, said second rasp has a tongue projecting therefrom and extending into the opening between said forks also overlying the spring, a vertical pin between the rasps and beneath the fork and the tongue of the rasps, the pin having an enlarged top selectively engageable with the fork or the tongue, said spring encircling the pin and being compressed by downward movement of the pin.

9. The grinder of claim 1, wherein said first rasp having spaced forks projecting therefrom overlying the spring, the spaced forks forming an opening therebetween, said second rasp having a tongue projecting therefrom and extending into the opening between said forks also overlying the spring, a vertical pin between the rasps and beneath the fork and the tongue of the rasps, the pin having an enlarged top selectively engageable with the fork or the tongue, said spring encircling the pin and compressed by downward movement of the pin.

10. The grinder of claim 1, further comprising an indicator that displays to a user a name of the first condiment when the cam is in the first position and a name of the second condiment when the cam is in the second position.

11. The grinder of claim 10, wherein the indicator includes a fixed collar around which the first and second handles rotate, names of the first and second condiments being positioned on opposite sides of the collar, a window being provided in one of the first and second handles aligned with the names on the collar, the name of the first condiment being visible through the window when the cam is in the first position and the name of the second condiment being visible when the cam is in the second position.

12. A dual chamber condiment grinder having first and second chambers that are spaced and separate from each other, each chamber holding a condiment to be ground, each having a top wall and a bottom wall; means in each chamber for grinding the condiment in that chamber, a handle attached to the top of the chambers, said handle being operable to selectively actuate the means for grinding the condiment in one or the other of the first and second chambers; and wherein said means for grinding the condiment each includes a reciprocable rasp having a top region, a shear block, the shear block being spaced from the rasp to define a shearing discharge gap therebetween, wherein movement of the rasp past the shear block will grind the condiment in a respective chamber and discharge the ground condiment through the discharge gap.

13. The grinder of claim 12, said handle including a pivotable member having a cam engageable with the top region of a rasp, and a fixed member, said handle being mounted above the chambers, said cam being movable relative to the handle to be positioned selectively over one or the other of the rasps.

14. The grinder of claim 12, said handle including a pivotable member having a cam engagable with the top region of a rasp, and said handle being rotatable to selectively position the cam over one or the other of the tops of the rasp.

15. The grinder of claim 12, wherein said first rasp has spaced forks projecting therefrom overlying the spring, the spaced forks forming an opening therebetween, said second rasp having a tongue projecting therefrom and extending into the opening between said forks also overlying the spring.

16. The grinder of claim 15, wherein a vertical pin is positioned between the rasps and beneath the forks and the tongue of the rasps, the pin having an enlarged top selectively engageable with the forks or the tongue, said spring encircling the pin and compressed by downward movement of the pin.

17. The grinder of claim 12, wherein said handle is rotatably mounted on the chambers for selectively actuating the grinding means of a respective chamber.

18. A dual chamber condiment grinder having first and second chambers that are spaced and separate from each other, each chamber holding a condiment to be ground, each having a top wall and a bottom wall; means in each chamber for grinding the condiment in that chamber, a handle attached to the top of the chambers, said handle being operable to selectively actuate the means for grinding the condiment in one or the other of the first and second chambers; and wherein said handle includes a cam for actuating said grinding means in a respective chamber, said cam being movable selectively within the handle from a position to actuate the grinding means of the first chamber to a position to actuate the grinding means of the second chamber.

19. A dual chamber condiment grinder having first and second chambers that are spaced and separate from each other, each chamber holding a condiment to be ground, each having a top wall and a bottom wall; means in each chamber for grinding the condiment in that chamber, a handle attached to the top of the chambers, said handle being operable to selectively actuate the means for grinding the condiment in one or the other of the first and second chambers; and further comprising an indicator that displays to a user a name of the first condiment when the handle is selectively positioned to actuate the means for grinding the condiment in the first chamber and a name of the second condiment is displayed to the user when the handle is selectively positioned to actuate the means for grinding the condiment in the second chamber.

20. The grinder of claim 19, wherein the indicator includes a fixed collar around which the handle rotates, names of the first and second condiments being positioned on opposite sides of the collar, a window being provided in the handle aligned with the names on the collar, the name of the first condiment being visible through the window when the handle is positioned to actuate the means for grinding the condiment in the first chamber and the name of the second condiment being visible through the window when the handle is positioned to actuate the means for grinding the condiment in the second chamber.

* * * * *